United States Patent
Zilka

(10) Patent No.: US 11,526,324 B2
(45) Date of Patent: Dec. 13, 2022

(54) SMART MIRROR SYSTEM AND METHOD

(71) Applicant: Ryland Stefan Zilka, Los Gatos, CA (US)

(72) Inventor: Ryland Stefan Zilka, Los Gatos, CA (US)

(*) Notice: Subject to any disclaimer, the term of this patent is extended or adjusted under 35 U.S.C. 154(b) by 0 days.

(21) Appl. No.: 17/656,398

(22) Filed: Mar. 24, 2022

(65) Prior Publication Data

US 2022/0214853 A1    Jul. 7, 2022

(51) Int. Cl.
| | |
|---|---|
| *G06F 3/14* | (2006.01) |
| *G06V 40/16* | (2022.01) |
| *G06F 3/01* | (2006.01) |
| *G06F 3/0482* | (2013.01) |
| *G06T 3/40* | (2006.01) |
| *F04D 27/00* | (2006.01) |
| *A45D 44/00* | (2006.01) |
| *G06T 11/60* | (2006.01) |

(52) U.S. Cl.
CPC ......... *G06F 3/1454* (2013.01); *A45D 44/005* (2013.01); *F04D 27/00* (2013.01); *G06F 3/012* (2013.01); *G06F 3/0482* (2013.01); *G06T 3/40* (2013.01); *G06T 11/60* (2013.01); *G06V 40/172* (2022.01); *G06V 40/174* (2022.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 8,976,160 | B2* | 3/2015 | Vilcovsky | G06T 11/00 345/212 |
| 9,800,829 | B2* | 10/2017 | White | H04N 21/2547 |
| 10,052,026 | B1* | 8/2018 | Tran | A61B 5/165 |
| 10,719,134 | B2* | 7/2020 | Aman | A63J 21/00 |
| 11,281,893 | B2* | 3/2022 | Zechner | G06T 11/00 |
| 11,350,026 | B1* | 5/2022 | Manzari | H04N 5/23229 |
| 2009/0116766 | A1* | 5/2009 | Matsumoto | G06T 7/75 382/311 |
| 2015/0262286 | A1* | 9/2015 | Cypher | G06Q 30/0261 705/26.61 |
| 2016/0070356 | A1* | 3/2016 | Aguirre | G06F 3/011 345/156 |
| 2016/0284132 | A1* | 9/2016 | Kim | G06V 40/103 |
| 2016/0307251 | A1* | 10/2016 | Howe | G06Q 30/0623 |

(Continued)

OTHER PUBLICATIONS

V. Kitanovski and E. Izquierdo, "Augmented reality mirror for virtual facial alterations," 2011 18th IEEE International Conference on Image Processing, 2011, pp. 1093-1096, doi: 10.1109/ICIP.2011.6115616. (Year: 2011).*

(Continued)

*Primary Examiner* — William L Bashore
*Assistant Examiner* — Nathan K Shrewsbury
(74) *Attorney, Agent, or Firm* — Lincoln Law School of San Jose

(57) ABSTRACT

A smart mirror system is provided, comprising a mirror, a camera, and a processor in communication with the camera and the mirror. In use, an image of a face is received for performing facial recognition. Based on the facial recognition, at least one of a plurality of users of the mirror is identified, for tailoring operation of the mirror for the at least one user.

18 Claims, 7 Drawing Sheets

(56) References Cited

U.S. PATENT DOCUMENTS

| | | | |
|---|---|---|---|
| 2017/0053456 A1* | 2/2017 | Cho | G06F 1/163 |
| 2017/0230453 A1* | 8/2017 | Verma | H04L 67/06 |
| 2018/0253840 A1* | 9/2018 | Tran | G16H 40/63 |
| 2018/0268747 A1* | 9/2018 | Braun | G09F 9/30 |
| 2018/0278879 A1* | 9/2018 | Saban | G06V 40/162 |
| 2019/0188773 A1* | 6/2019 | Chu | G06F 16/5866 |
| 2019/0250781 A1* | 8/2019 | Savitski | H04M 1/72436 |
| 2020/0134352 A1* | 4/2020 | Choi | G06V 20/52 |
| 2020/0336705 A1* | 10/2020 | Mouizina | H05B 47/11 |
| 2020/0372878 A1* | 11/2020 | Kim | G09G 5/37 |
| 2021/0043018 A1* | 2/2021 | Zhang | G07C 9/00571 |
| 2021/0125703 A1* | 4/2021 | Moskowitz | G16H 50/20 |
| 2021/0150684 A1* | 5/2021 | Elmoznino | G06N 3/0454 |
| 2021/0150728 A1* | 5/2021 | Ahmed | G06V 40/12 |
| 2021/0173480 A1* | 6/2021 | Osterhout | G06F 3/03547 |
| 2021/0250510 A1* | 8/2021 | Choe | H04N 5/2628 |
| 2022/0086991 A1* | 3/2022 | Park | G06V 10/141 |
| 2022/0174242 A1* | 6/2022 | Culver, II | H04N 1/32374 |
| 2022/0214853 A1* | 7/2022 | Zilka | H04M 1/72454 |

OTHER PUBLICATIONS

T. Blum, V. Kleeberger, C. Bichlmeierand N. Navab, "mirracle: An augmented reality magic mirror system for anatomy education," 2012 IEEE Virtual Reality Workshops (VRW), 2012, pp. 115-116, doi: 10.1109/VR.2012.6180909. (Year: 2012).*

Z. Wei, "Optimizing 3D Virtual Fitting Mirror Using Augmented Reality Technology under Internet Plus," 2022 IEEE International Conference on Electrical Engineering, Big Data and Algorithms (EEBDA), 2022, pp. 486-489, doi: 10.1109/EEBDA53927.2022. 9745006. (Year: 2022).*

D. Prakash, J. V. J, S. Ghosh, S. N. B, S. A. Deborah and K. R. S. Chandran, "Virtual Fashion Mirror," 2020 4th International Conference on Computer, Communication and Signal Processing (ICCCSP), 2020, pp. 1-4, doi: 10.1109/ICCCSP49186.2020.9315257. (Year: 2020).*

\* cited by examiner

SMART MIRROR SYSTEM AND METHOD

FIELD OF THE INVENTION

The present invention relates to mirrors and, more particularly, to smart mirrors.

BACKGROUND

Smart mirrors are becoming more and more popular. Such smart mirrors have a variety of functions, including the display of information. In situations where such smart mirrors have more than one user, a problem arises in terms of determining what information to display, as different users may be interested in different information.

There is thus a need for addressing these and/or other issues associated with the prior art.

SUMMARY

A smart mirror system is provided, comprising a mirror and a camera. In use, an image of a face is received for performing facial recognition. Based on the facial recognition, at least one of a plurality of users of the mirror is identified, for tailoring operation of the mirror for the at least one user.

DETAILED DESCRIPTION

Figure 1:
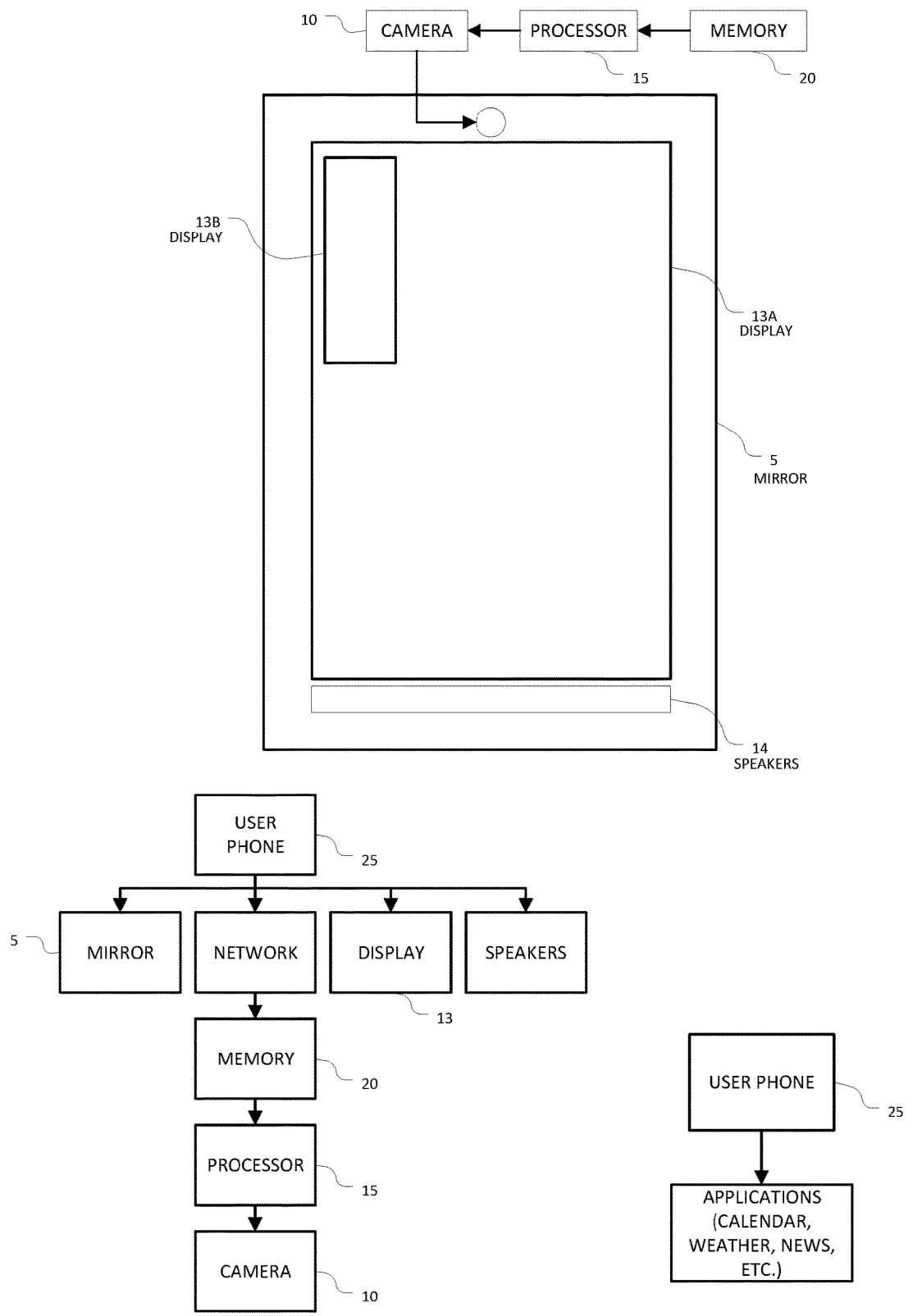
FIG. 1 illustrates a smart mirror system, in accordance with one embodiment.

FIG. 1 illustrates a smart mirror 1, in accordance with one embodiment.

As shown in FIG. 1, the smart mirror 1 includes a mirror 5; a camera 10; a display 13 and speakers 14, and a processor 15 in communication with the camera 10. Also included is a non-transitory computer readable storage medium (e.g. memory 20) in communication with the processor 15 for storing one or more instructions (e.g. software) for controlling the smart mirror 1. In one embodiment, the mirror 5 includes a reflective surface without any electronic componentry. In another embodiment, the mirror 5 includes another display (or a portion or entirety of the display 13) for displaying a visual depiction of the user that is captured using the camera 10.

In one embodiment, the memory 20 may be a hard drive, solid state memory, or any other kind of memory in the smart mirror 1 for storing any information needed for the smart mirror 1 to operate. As further shown in FIG. 1, a user phone 34 may be connected to a network to allow communication with all of the components shown in FIG. 1. The user phone 34 may include multiple applications (e.g. a calendar application, weather application, news application, etc.) for communicating with the various components above.

Figure 2A:
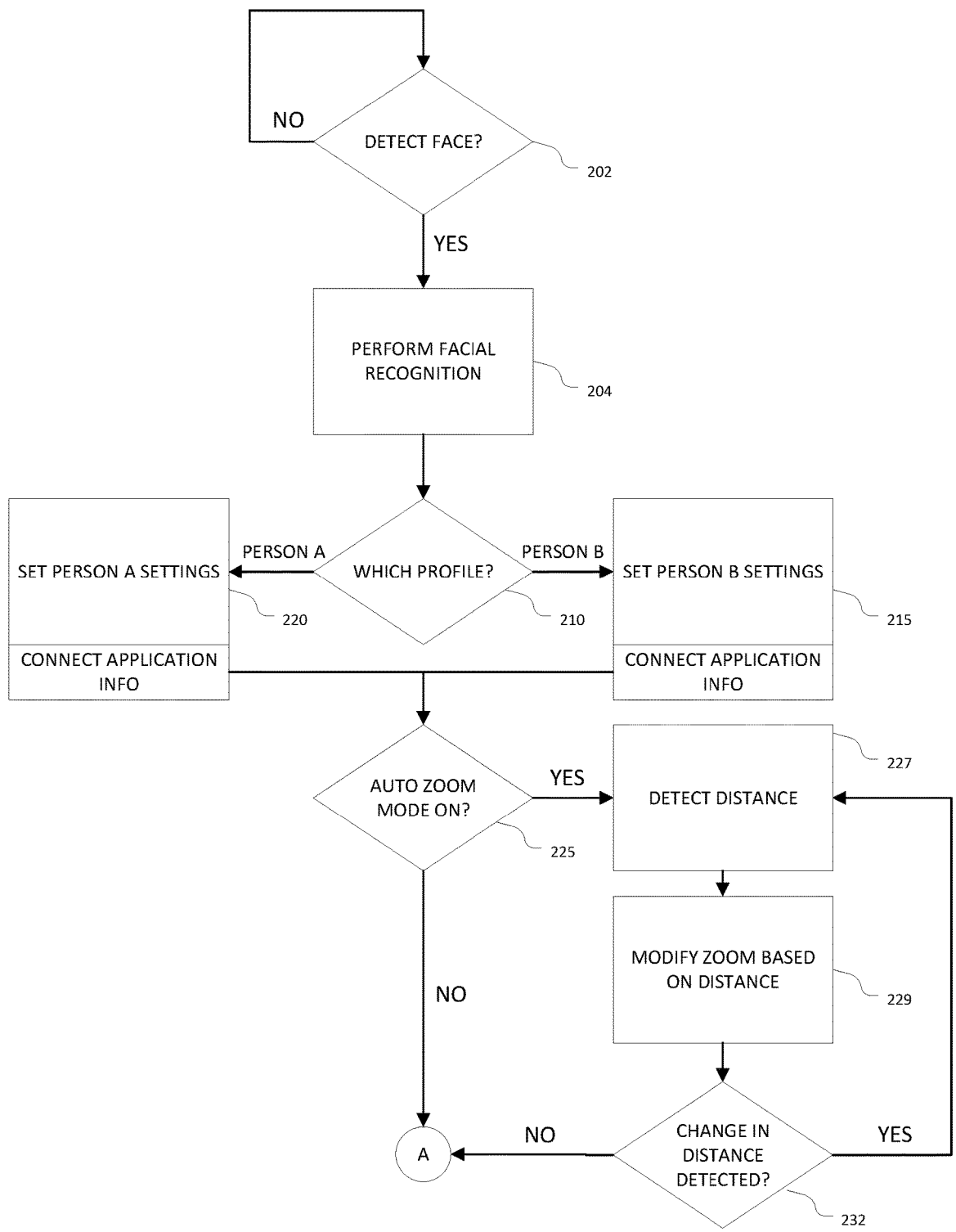
FIG. 2A describes a method for controlling a smart mirror.

FIG. 2A describes a method 200 for controlling a smart mirror, such as the one shown in FIG. 1.

In decision 202, the smart mirror determines whether a face is detected. This is accomplished by receiving an image from a camera and then using general facial recognition to determine whether any human is present in front of the smart mirror. If it is determined that the smart mirror does not detect a face, the smart mirror repeats decision 202 while waiting for a person to stand in front of the mirror.

If it is determined that the smart mirror does detect a face, the smart mirror performs facial recognition in operation 204. The smart mirror does this to allow different people to log into and access different profiles of the smart mirror. For example, a first person may have a first profile account for using the smart mirror, and a second person may have a second profile account for using the smart mirror. As another example, the first person may have two profiles, a first profile account for using the smart mirror during a work day, and a second profile account for using the smart mirror during a weekend or holiday.

In decision 210, the smart mirror determines which profile to use based on the facial recognition of operation 204. If it is determined in decision 210 that the profile is for Person A, the smart mirror, in operation 220, sets the smart mirror settings to Person A's settings and connects to Person A's mobile device to receive application information for being used during operation of the smart mirror. If it is determined in decision 210 that the profile is for Person B, the smart mirror, in operation 215, sets the smart mirror settings to Person B's settings and connects to Person B's mobile device to receive application information for being used during operation of the smart mirror. For example, the smart mirror settings may include Twitter, Snapchat, and or Facebook. Also, the application information may include calendar, weather, clock, and news information.

Figure 2B:
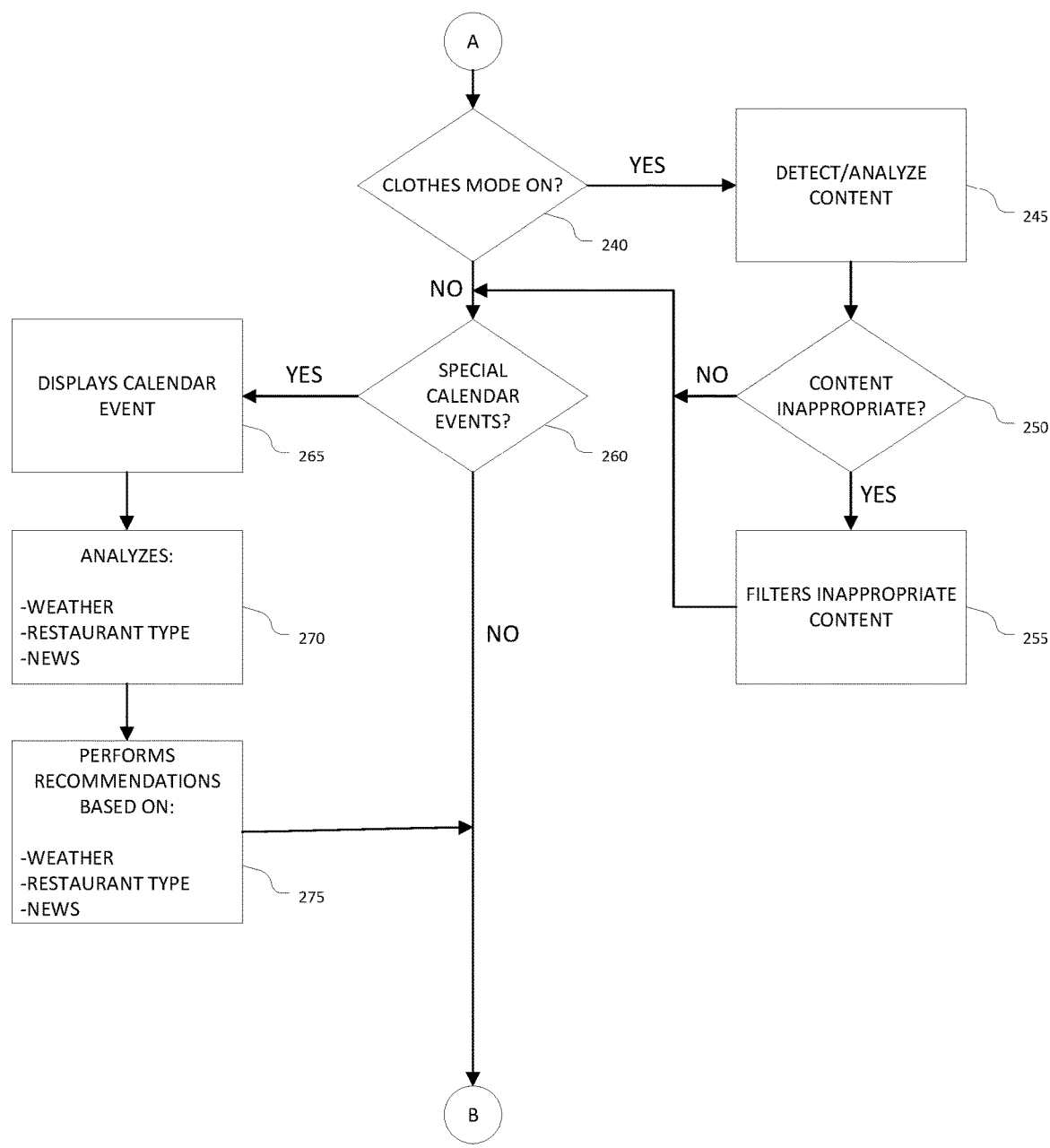
FIG. 2B describes a continuation of the method of FIG. 2A.

In decision 225, the smart mirror determines whether the smart mirror auto-zoom feature is enabled based on profile settings. For example, for some profiles, the feature may be disabled. If it is determined in decision 225 that auto-zoom mode is on, a distance between the face detected in decision 202 and the smart mirror is determined in operation 227. This may be accomplished by using a distance sensing mechanism (e.g. a time of flight sensor, etc.). After the distance between the face and the smart mirror is determined in operation 227, a magnitude of a zoom feature is modified based on the distance, in operation 229. Then, in decision 232, it is determined whether there is another change in the distance between the face and the smart mirror. If so, operations 227 and 229 are repeated. If not, the method 200 continues as shown in FIG. 2B. Also, if it is determined in decision 225 that auto-zoom mode is disabled, the camera will not detect the distance, will not modify the zoom based on the distance, and will continue as shown in FIG. 2B.

FIG. 2B describes a continuation of the method 200 of FIG. 2A.

In decision 240, the smart mirror determines whether a clothes mode feature is on based on profile settings. For example, for some profiles, the feature may be disabled. If it is determined in decision 240 that the clothes mode is on, the smart mirror will detect and analyze any inappropriate content, as shown in operation 245. In one embodiment, this may be accomplished using image recognition technology that is trained to identify nudity or other inappropriate content.

In decision 250, the smart mirror determines whether the content detected in operation 245 is inappropriate or not, based on whether nudity is detected. If it is determined in decision 250 that the content detected is inappropriate, the smart mirror will filter the inappropriate content in operation 255. In one embodiment, this may be done by blacking out pixels of the content that correspond (or display) the nudity (or other inappropriate content). This pixel black out may continue while nudity continues to be detected or cease when nudity is no longer detected.

If, in decision 240, it is determined that the smart mirror is not in clothes mode, the smart mirror determines, in decision 260, whether there are any special calendar events based on connected smart devices applications. As mentioned earlier, in operations 215 and 220, calendar information associated with a particular user may be downloaded from the user's mobile device (using Bluetooth or WiFi), and such calendar information may include calendared events for the current day.

If it is determined in decision 260 that there are special calendar events for that day, the smart mirror will display the special calendar event in operation 265. Next, the smart mirror will use operation 270 to analyze any information that will be useful in producing a recommendation.

As mentioned earlier, in operations 215 and 220, weather information associated with a location of the particular user may be downloaded from the user's mobile device (using Bluetooth or WiFi), and such weather information may include an indication of temperature and/or chance of precipitation.

Then, in operation 275, the smart mirror will display recommendations based on information gathered from operation 270. For example, if person A were going to a restaurant that was marked as an event on the calendar, then the smart mirror would gather information from the restaurant such as the type of restaurant, any expected attire, or any recent news coming from the restaurant. The smart mirror would then make clothing recommendations based off of the restaurant type and the day's weather.

Figure 2C:
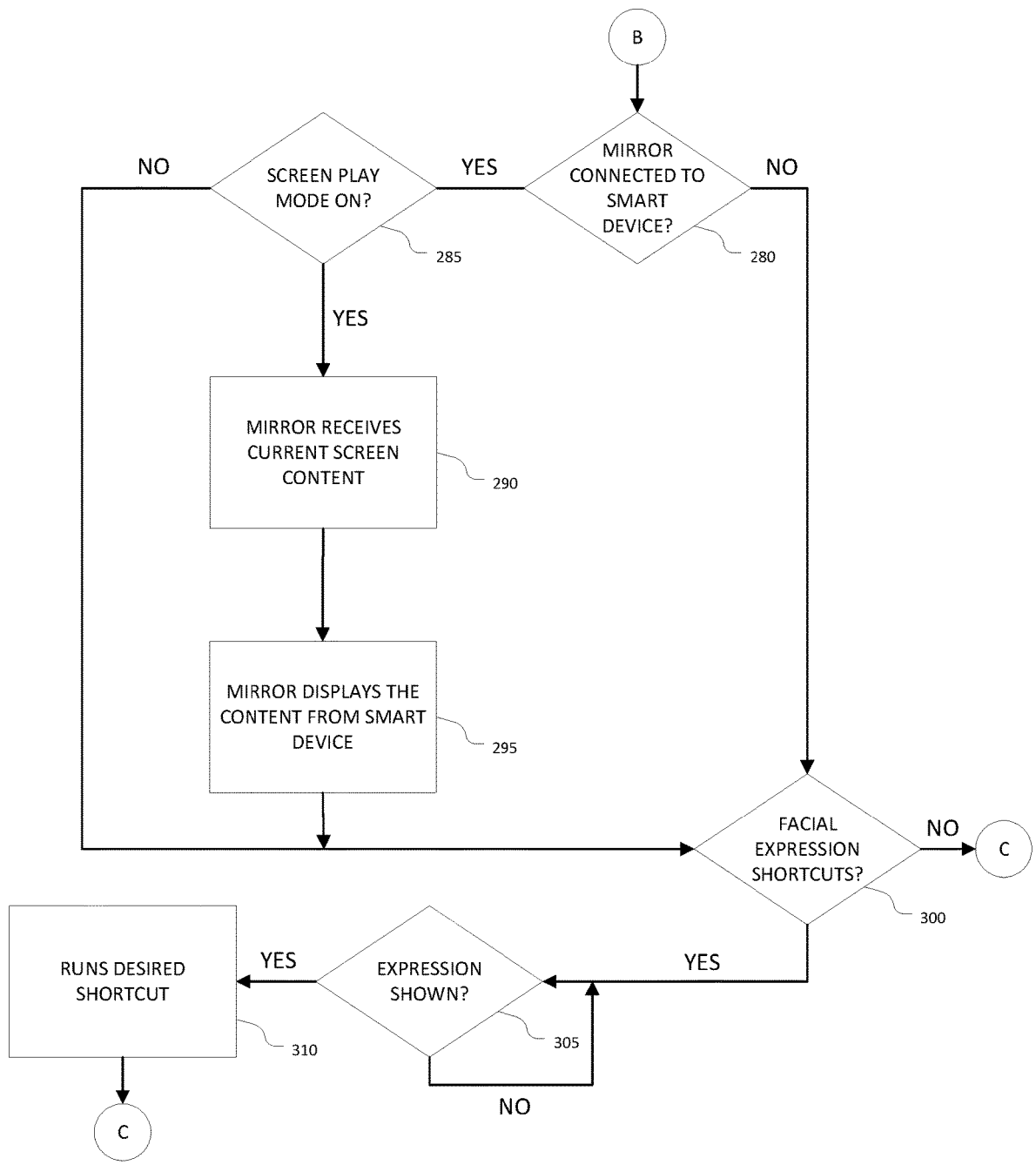
FIG. 2C describes a continuation of the method of FIG. 2B.

FIG. 2C describes a continuation of the method 200 of FIG. 2B.

In decision 280, the smart mirror determines whether the smart mirror is connected to another smart device. If it is determined in decision 280 that the smart mirror is connected to another smart device, decision 285 determines whether screen mirror mode is enabled or not. If it is determined in decision 285 that screen mirror mode is enabled, the method 200 continues to operation 290. In operation 290, the smart mirror receives the current screen content from the connected smart device. Then, in operation 295, the smart mirror displays the content shared by the connected smart device.

If it is determined in decision 280 that the smart mirror isn't connected to another smart device, if it is determined in decision 285 that screen mirror mode is not enabled, or after operation 295 is performed, the method 200 continues to decision 300. In decision 300, it is determined whether facial expression shortcuts are enabled. If it is determined in decision 300 that facial expression shortcuts are enabled, the method 200 continues to decision 305. In decision 305, the method 200 determines whether the facial expression linked to a certain shortcut is detected in the view of the camera. If it is determined in decision 305 that a face expression shortcut is detected, operation 310 is activated. In operation 310, the smart mirror runs the desired shortcut. If it is determined in decision 305 that a face expression shortcut is not detected, decision 305 will loop. If it is determined in decision 300 that facial expression shortcuts are disabled, the method 200 moves to decision 315.

To set up face expression shortcuts, a user will have to record a certain facial expression. A certain facial expression will activate the shortcut that is linked to the expression. For instance, if a user wants to make a shortcut to send an email to their boss, he/she would link a specific expression to the shortcut.

Figure 2D:
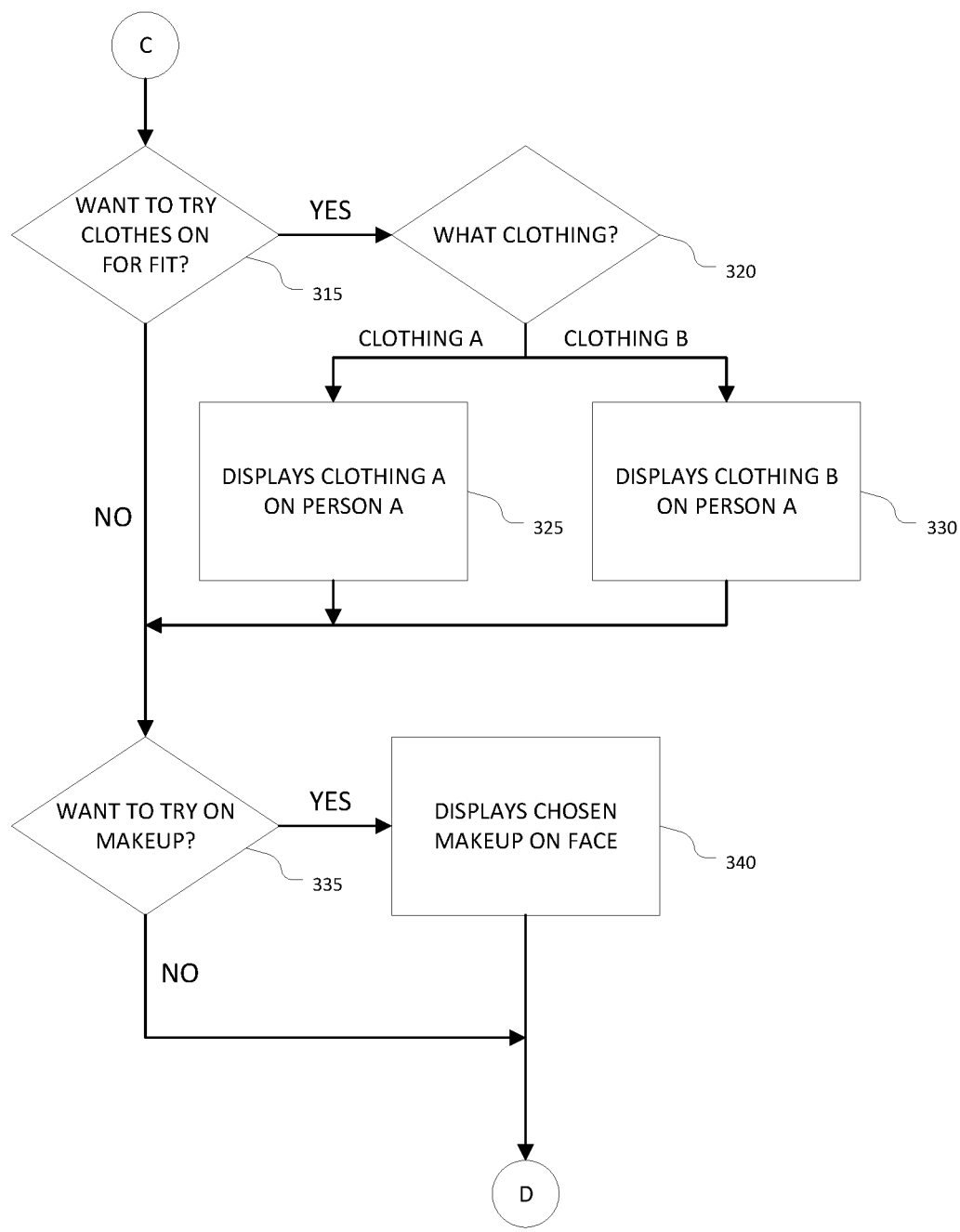
FIG. 2D describes a continuation of the method of FIG. 2C.

FIG. 2D describes a continuation of the method 200 of FIG. 2C.

In decision 315, the smart mirror determines whether the user wants to "virtually" try on digital clothes for help decide what the user wants to actually wear on a certain day. If the smart mirror determines in decision 315 that the user wants to try on digital clothes, decision 315 continues to decision 320, in which the smart mirror determines what clothing the user wants. For example, if it is determined in decision 320 that the user chooses clothing A, then it continues to operation 325, in which the smart mirror displays clothing A on the user using an overlay. If it is determined in decision 320 that the user chooses clothing B, then it continues to operation 330, in which the smart mirror displays clothing B on the user using an overlay.

In one embodiment, decision 320 may be performed by scanning a body of the user including the head, torso, legs, etc. The smart mirror then continues by displaying recently-worn clothes as an overlay to the body. In one example, this is carried out by detecting the user's clothing during previous use of the smart mirror, and using a camera to capture a picture of such clothing. Such picture can then be processed to generate a signature (and/or model, and/or an identifying logo/aspect, etc.) associated with the clothing picture. Then, this signature can be compared to signatures in a database that correlates such signatures with pictures of a variety of known clothing. Such database can be built, for example, by downloading pictures of clothing from the Internet and creating signatures for them. When a match is found between the signature of the captured picture and a signature in the database, the picture from the database is used to overlay onto the display of the user on the smart mirror. In another embodiment, the captured picture (from previous use of the smart mirror) can simply be used as the overlay itself.

Figure 3:
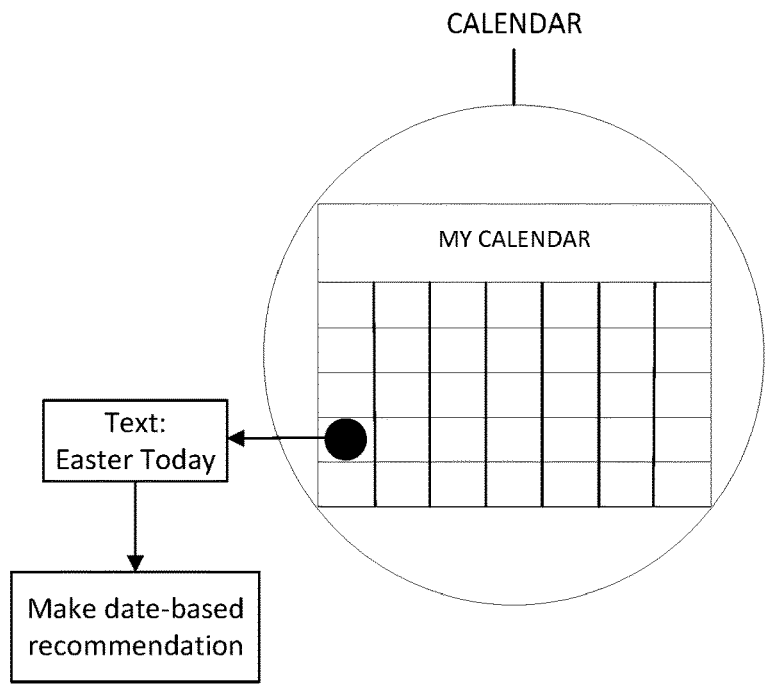
FIG. 3 shows an example of an interface for a smart mirror.
Figure 3:
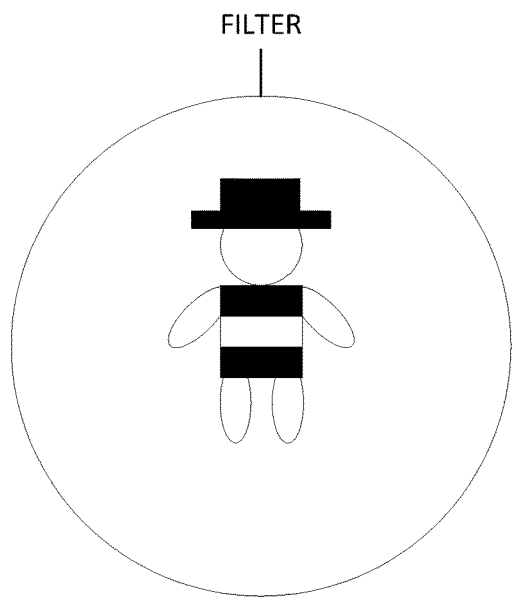

After overlaying the picture of the clothing on the user's body, the user can swipe right and left to change the clothing, which overlays different clothing pictures onto the user's body. If the hand is detected swiping above the neck, the smart mirror changes a hat, glass, and/or a mask, for example. If the hand is detected swiping on the torso, the smart mirror changes the shirt, jacket, and/or tie. If the hand is detected swiping on the legs, the smart mirror changes the pants or trousers. Swiping up and down on these same areas will change the variations of the clothing, such as color (if different colors of such clothing exists), type of garment (bow tie vs. conventional tie), etc. This process can be continued until a desired outfit is found. An example of an interface for accomplishing this is shown in FIG. 3.

Which clothing pictures to display first may be decided in various ways. For example, the most frequently worn clothing may be displayed first. As another example, during previous use, the user may be given the option to select a particular outfit as a "favorite" by selecting a "favorite" button that is displayed with the interface of FIG. 3, for example. In one embodiment, each section of the interface of FIG. 3 may include a "favorite" button for each of the head garment, torso garment, and/or trousers.

While not shown, the user may select a button to share a screenshot of the configured/selected virtual outfit on social media. For example, a twitter, snapchat, and/or facebook button may be selected to share the screenshot with contacts (such as friends) that are associated with the specific account identified for the particular user earlier. Further, likes and/or dislikes received via the social media account may be displayed on the smart mirror to provide the user with feedback on a currently selected outfit. In another embodiment where the user's calendar information is received, the smart mirror may identify a particular person(s) who the user is meeting today, and display a button that, when selected, sends the screenshot to that person with a message saying "do you like this outfit". In another embodiment, an interactive interface, such as the one in FIG. 3, may be displayed to such other person, so that such person may swipe and configure the outfit and send such recommendation (as another screenshot) to the user. That way, the user can ask friends and/or somebody they are meeting for input and advice on what to where for the day and/or a calendar event.

Then, operations 325 and 330 continue to decision 335. If it is determined in decision 315 that the user does not want to try on digital clothing, the smart mirror continues to decision 335. In decision 335, the smart mirror determines whether the user wants to try on digital makeup. If it is determined in decision 335 that the user does want to try on makeup, the smart mirror continues to operation 340. In operation 340, the smart mirror displays the chosen makeup on the user's face. If it is determined in decision 335 that the user doesn't want to try on makeup, the smart mirror continues to 2E.

Figure 2E:
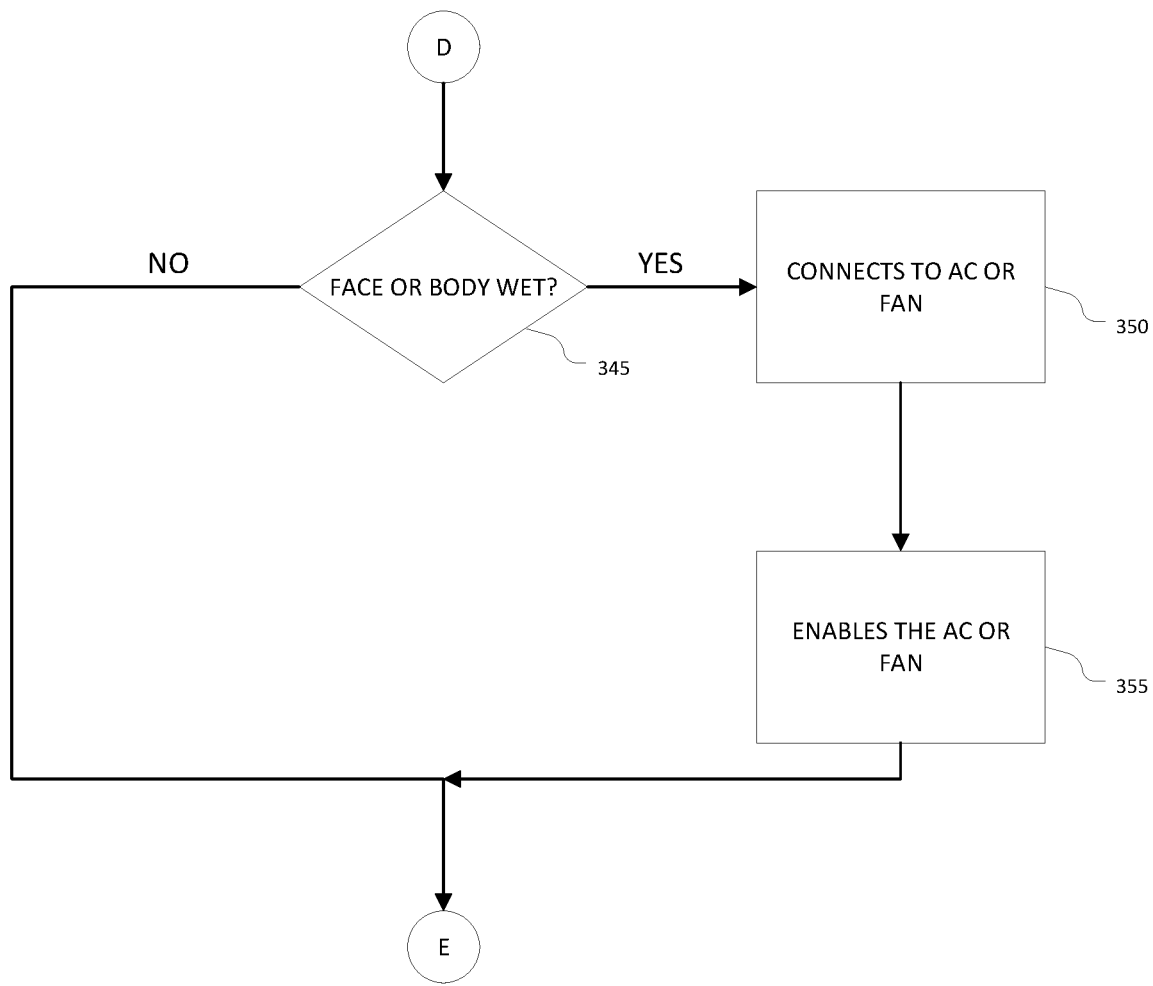
FIG. 2E is a continuation of the method of FIG. 2D.

FIG. 2E is a continuation of the method 200 of FIG. 2D.

In decision 345, the smart mirror determines whether the user's face is wet or not. In one embodiment, this may be accomplished by detecting water droplets on the face of the user.

If it is determined in decision 345 that the user's face is wet, the smart mirror continues to operation 350. In operation 350, the smart mirror connects to a local AC or fan available. It continues to operation 355. In operation 355, the smart mirror turns on the AC or fan.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, a method is provided, comprising: at an apparatus including: a mirror; a camera; and a processor in communication with the camera and the mirror: receiving an image of a face, utilizing the camera; performing facial recognition in connection with the image of the face, utilizing the processor; based on the facial recognition, identifying at least one of a plurality of users of the mirror; and tailoring operation of the mirror for the at least one user, in response to the identification of the at least one user.

In another embodiment, a system is provided, comprising: a mirror; a camera; a processor in communication with the camera and the mirror; a non-transitory computer readable storage medium in communication with the processor for storing one or more programs, the one or more programs comprising instructions which, when executed by the processor, cause the system to: receive an image of a face, utilizing the camera; perform facial recognition in connection with the image of the face, utilizing the processor; based on the facial recognition, identify at least one of a plurality of users of the mirror; and tailor operation of the mirror for the at least one user, in response to the identification of the at least one user.

In one embodiment, the tailored operation includes a display of information via the system.

In one embodiment, the operation is tailored utilizing information that is received from a mobile phone of the at least one user. Such information may include weather information, calendar information, news information, and/or a screen mirroring video including content of a display of the mobile device of the at least one user.

In one embodiment, the one or more programs comprise instructions which, when executed by the processor, cause the system to: determine a distance between the mirror and the face of the least one user, and automatically alter a zoom function of the mirror based on the distance.

In one embodiment, the one or more programs comprise instructions which, when executed by the processor, cause the system to: detect at least one of a plurality of facial expressions, and automatically perform at least one shortcut operation based on the detected at least one facial expression.

In one embodiment, the one or more programs comprise instructions which, when executed by the processor, cause the system to: detect moisture on the user, and automatically activate a fan based on the detected moisture on the user.

In one embodiment, the one or more programs comprise instructions which, when executed by the processor, cause the system to: display different articles of clothing, detect a selection of at least one article of the clothing, and automatically display the user with a virtual presentation with the selected at least one article of the clothing.

In one embodiment, the one or more programs comprise instructions which, when executed by the processor, cause the system to: display different make-up articles, detect a selection of at least one make-up article, and automatically display the user with a virtual presentation with a virtual application of the at least one make-up article.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a", "an", "the", and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
   a mirror;
   a camera;
   a processor in communication with the camera;
   a non-transitory computer readable storage medium in communication with the processor for storing one or more programs, the one or more programs comprising instructions which, when executed by the processor, cause the system to:
   receive an image of a face, utilizing the camera; perform facial recognition in connection with the image of the face, utilizing the processor;
   based on the facial recognition, identify at least one of a plurality of users of the mirror; and
   tailor operation of the mirror for the at least one user, in response to the identification of the at least one user, wherein the operation is tailored utilizing information that is received from a mobile phone of the at least one user, where:
   the information includes: calendar information associated with an event at a restaurant, restaurant information associated with a type of the restaurant, news information from the restaurant, and weather information associated with a day of the event at the restaurant, such that, based on the type of the restaurant and the weather information associated with the day of the event at the restaurant, a recommended article of clothing is automatically selected, to display the at least one user in a virtual presentation with the recommended article of clothing; and wherein the one or more programs comprise instructions which, when executed by the processor, cause the system to operate such that: a body of the at least one user is scanned including a head and a torso of the at least one user to identify recently-worn clothes, and the recommended article of clothing includes the recently-worn clothes; and the identification of the recently-worn clothes is processed to generate a first signature of the recently-worn clothes which is compared to other signatures in a database built by downloading pictures of clothing from the Internet and creating the other signatures for the pictures of the clothing, and further such that, when a match is identified between the first signature of the recently-worn clothes and one of the other signatures in the database, a corresponding one of the pictures in the database is used to overlay onto a display of the at least one user via the mirror.

2. The system of claim 1, wherein the one or more programs comprise instructions which, when executed by the processor, cause the system to: determine a distance between the mirror and the face of the least one user, and automatically alter a zoom function of the mirror based on the distance.

3. The system of claim 1, wherein the one or more programs comprise instructions which, when executed by the processor, cause the system to: detect at least one of a plurality of facial expressions, and automatically perform at least one shortcut operation based on the detected at least one facial expression, where the one of the facial expressions is recorded by the at least one user and linked to the at least one shortcut operation.

4. The system of claim 1, wherein the one or more programs comprise instructions which, when executed by the processor, cause the system to: detect moisture on the at least one user, and automatically activate a fan based on the detected moisture on the at least one user.

5. The system of claim 1, wherein the one or more programs comprise instructions which, when executed by the processor, cause the system to: display different make-up articles, detect a selection of at least one make-up article, and automatically display the at least one user with a virtual presentation with a virtual application of the at least one make-up article.

6. The system of claim 1, wherein the one or more programs comprise instructions which, when executed by the processor, cause the system to operate such that the at least one user has an associated first profile account for using the mirror during a work day, and a second profile account for using the mirror during a non-work day.

7. The system of claim 2, wherein the one or more programs comprise instructions which, when executed by the processor, cause the system to operate such that the zoom function is disabled for at least one other of the plurality of users.

8. The system of claim 1, wherein the one or more programs comprise instructions which, when executed by the processor, cause the system to detect a swipe of a user that causes display of different ones of the recently-worn clothes.

9. The system of claim 8, wherein the one or more programs comprise instructions which, when executed by the processor, cause the system to operate such that: a most recently-worn one of the recently-worn clothes is displayed first.

10. The system of claim 8, wherein the one or more programs comprise instructions which, when executed by the processor, cause the system to detect the swipe of the at least one user in relation to only one of different parts of the body of the at least one user to cause the display of the different ones of the recently-worn clothes for only the one of the different parts of the body of the at least one user.

11. The system of claim 10, wherein the one or more programs comprise instructions which, when executed by the processor, cause the system to operate such that the swipe is a horizontal swipe, and the system is configured to detect a vertical swipe of the at least one user in relation to the only one of the different parts of the body of the at least one user to cause the display of color or type variations in the different ones of the recently-worn clothes.

12. The system of claim 11, wherein the one or more programs comprise instructions which, when executed by the processor, cause the system to cause a sharing, over a network, of the different ones of the recently-worn clothes, and receipt of feedback, over the network, relating to the different ones of the recently-worn clothes.

13. The system of claim 11, wherein the one or more programs comprise instructions which, when executed by the processor, cause the system to cause a sharing, over a network, of the different ones of the recently-worn clothes, with another person identified in connection with event of the calendar information.

14. The system of claim 1, wherein the one or more programs comprise instructions which, when executed by the processor, cause the system to operate such that:
  a distance is determined between the mirror and the face of the least one user, to automatically alter a zoom function of the mirror based on the distance;
  the zoom function is disabled for at least one other of the plurality of users;
  the at least one user has an associated first profile account for using the mirror during a work day, and a second profile account for using the mirror during a non-work day; and
  a body of the at least one user is scanned including a head and a torso of the at least one user to identify recently-worn clothes, and the recommended article of clothing includes the recently-worn clothes.

15. The system of claim 14, wherein the one or more programs comprise instructions which, when executed by the processor, cause the system to operate such that:
  the identification of the recently-worn clothes is processed to generate a first signature of the recently-worn clothes which is compared to other signatures in a database built by downloading pictures of clothing from the Internet and creating the other signatures for the pictures of the clothing, and further such that, when a match is identified between the first signature of the recently-worn clothes and one of the other signatures in the database, a corresponding one of the pictures in the database is used to overlay onto a display of the at least one user via the mirror;
  a swipe of a user causes display of different ones of the recently-worn clothes, where a most recently-worn one of the recently-worn clothes is displayed first, the swipe of the at least one user is detected in relation to only one of different parts of the body of the at least one user to cause the display of the different ones of the recently-worn clothes for only the one of the different parts of the body of the at least one user, and the swipe is a horizontal swipe, such that the system is configured to detect a vertical swipe of the at least one user in relation to the only one of the different parts of the body of the at least one user to cause the display of color or type variations in the different ones of the recently-worn clothes.

16. The system of claim 15, wherein the one or more programs comprise instructions which, when executed by the processor, cause the system to cause a sharing, over a network, of the different ones of the recently-worn clothes, and receipt of feedback, over the network, relating to the different ones of the recently-worn clothes.

17. The system of claim 15, wherein the one or more programs comprise instructions which, when executed by the processor, cause the system to cause a sharing, over a network, of the different ones of the recently-worn clothes, with another person identified in connection with event of the calendar information.

18. A method, comprising: at an apparatus including:
   a mirror;
   a camera; and
   a processor in communication with the camera and the mirror:
      receiving an image of a face, utilizing the camera;
      performing facial recognition in connection with the image of the face, utilizing the processor; based on the facial recognition, identifying at least one of a plurality of users of the mirror; and
      tailoring operation of the mirror for the at least one user, in response to the identification of the at least one user, wherein the operation is tailored utilizing information that is received from a mobile phone of the at least one user, where:
         the information includes: calendar information associated with an event at a restaurant, restaurant information associated with a type of the restaurant, news information from the restaurant, and weather information associated with a day of the event at the restaurant, such that, based on the type of the restaurant and the weather information associated with the day of the event at the restaurant, a recommended article of clothing is automatically selected, to display the at least one user with a virtual presentation in the recommended article of clothing wherein the one or more programs comprise instructions which, when executed by the processor, cause the system to operate such that: a body of the at least one user is scanned including a head and a torso of the at least one user to identify recently-worn clothes, and the recommended article of clothing includes the recently-worn clothes; and
         the identification of the recently-worn clothes is processed to generate a first signature of the recently-worn clothes which is compared to other signatures in a database built by downloading pictures of clothing from the Internet and creating the other signatures for the pictures of the clothing, and further such that, when a match is identified between the first signature of the recently-worn clothes and one of the other signatures in the database, a corresponding one of the pictures in the database is used to overlay onto a display of the at least one user via the mirror.

* * * * *